United States Patent
[19]

Mintchenko et al.

[11] Patent Number: 5,868,993

[45] Date of Patent: Feb. 9, 1999

[54] PROCESS FOR APPLYING COLOR TO CLAY

[76] Inventors: Igor Mintchenko; Irina Ilina, both of 921 Regency Rd., Danville, Ky. 40422

[21] Appl. No.: 822,038

[22] Filed: Mar. 24, 1997

Related U.S. Application Data

[60] Provisional application No. 60/024,010 Aug. 15, 1996.
[51] Int. Cl.⁶ ..................................................... C04B 33/28
[52] U.S. Cl. ........................... 264/602; 264/633; 264/632; 264/636; 264/637; 264/73; 264/74
[58] Field of Search .............................. 264/602, 73, 633, 264/632, 636, 637, 74

[56] References Cited

U.S. PATENT DOCUMENTS

| | | | |
|---|---|---|---|
| 361,231 | 4/1887 | Nichols | 264/602 |
| 526,669 | 9/1894 | McLaughlin . | |
| 1,984,059 | 12/1934 | Dandini . | |
| 2,270,075 | 1/1942 | Miller | 264/633 |
| 2,597,448 | 5/1952 | Carothers | 264/633 |
| 3,074,840 | 1/1963 | Teplansky et al. . | |
| 3,628,989 | 12/1971 | Solmi | 264/602 |
| 3,634,179 | 1/1972 | Anderson | 264/73 |

FOREIGN PATENT DOCUMENTS

| | | | |
|---|---|---|---|
| 57-196780 | 12/1982 | Japan | 264/602 |
| 1454263 | 11/1976 | United Kingdom | 264/602 |

*Primary Examiner*—James Derrington
*Attorney, Agent, or Firm*—Kenneth F. Pearce

[57] ABSTRACT

A process for applying color to an article made of clay. Color can be applied to such diverse articles as pottery, earthenware, figurines, ceramics, porcelains, china, tiles domes and other decorative roofings. The application of color to clay articles is easily adapted to industrial, commercial or artistic uses.

14 Claims, 3 Drawing Sheets

PROCESS FOR APPLYING COLOR TO CLAY

This Application for Letters Patent is relates back to Provisional Application, Ser. No. 60/024,010, Mintchenko, et. al., filed on Aug. 15, 1996 also entitled—Process For Applying Color To Clay.

BACKGROUND OF THE INVENTION

1. Field of the Invention

The present process is directed toward applying color to an article having clay as a principal component of its composition. Within the scope of the present invention, examples of articles that can be colored include such diverse items as pottery, earthenware, figurines, ceramics, porcelains, china, indoor and non-supportive outdoor tiles, domes and other decorative roofings. The process of applying color to clay articles is easily adapted to industrial, commercial or artistic uses.

2. Description of the Previous Art a) U.S. Pat. No. 526,669—McLaughlin discloses a process of decorating pottery. More particularly, McLaughlin enables a process for slip casting the inlaying of hollow articles such as vases and does not address the slip casting of solid articles. Instead of removing the pottery from the mold, before painting the pottery, as is still customary in the art, McLaughlin teaches that slip is painted onto the inner surface of the mold to yield the decorative inlay displayed on the body of the ware. After painting the mold, liquid state clay is then added to the mold. However, those skilled in the art know that when pouring liquid state clay into a mold, some of that liquified clay will seep into the seam of the mold resulting in a reciprocating protrusion on the molded and dried article. By way of example, it is common knowledge that selected items, i.e. figurines, do not acclimate well to having the reciprocating protrusion removed after the item has already been shaped. In many instances, the aesthetic appeal of the finished article is lessened due to the presence of the reciprocating protrusion while in many circumstances, the sanding away of the reciprocating protrusion on a multidimensional-surfaced article, such as a figurine, is laborious, if not impossible, especially were high volume industrial or commercial settings are mandated. Further complicating the practice of McLaughlin is the fact that the coloring slip tends to dry before the liquid state clay can be added to the mold. When this occurs, the paint may flake or chip which will attenuate exacting detail by lowering overall color resolution for the article, when it is viewed in its entirety.

b) U.S. Pat. No. 1,984,059—Dandini embodies a process for coloring the exterior of building blocks. A moist mixture of sandy material is colored and thereafter applied to the inner face walls of a mold. The exterior of the building blocks are impregnated with color when contacting the sandy material.

c) U.S. Pat. No. 3,074,840—Terplansky, et al., enables a single stage process for molding decorated plastic tableware. Synthetic resins are subjected to superatmospheric pressure and temperatures to yield the decorative plastics.

SUMMARY OF THE INVENTION

An object of the present invention is to provide a process for coloring an article composed of clay, such as, pottery or earthenware.

Another object of the present invention is to provide a process for coloring ceramics, porcelain, china, figurines or other works of art.

It is another object of the present invention to provide a process for coloring non-supporting indoor or outdoor tiles, domes and other decorative roofings.

It is yet another object of the present invention to provide a process for coloring clay which is industrially and commercially feasible.

It is still another object of the present invention to provide a process for coloring clay that is adaptable for professional or amateur artistic works.

Still another object of the present invention is to provide a process that allows color to be applied or adsorbed to the clay article, before the article is removed from its mold.

Yet still another object of the present invention is to provide a process that allows more than one color to be applied to the clay article, before removing the article from its mold.

It is still another object of the present invention to provide a process for coloring a multi-dimensional surfaced clay article, before removing the article from its mold.

Yet another object of the present invention is to provide a process for coloring and reproducing the clay article with exacting detail.

Still another object of the present invention is to provide a process which prevents the color being applied to the mold from drying, before the substance from which the clay article is being shaped can be added to the mold.

Yet still another object of the present invention is to provide a process for coloring the clay article which is capable of utilizing any color.

It is yet another object of the present invention to provide a process for coloring the clay article, wherein any substance that will adsorb onto the clay can be utilized.

Yet another object of the present invention is to provide a process for curing the clay article which requires only a single firing rather than the traditional double firing known commonly in the art.

Still another object of the present invention is to provide a process for coloring the clay article wherein the seam of the mold does not produce a reciprocating protrusion in the clay article being shaped.

Yet sill another object of the present invention is to provide a process for coloring a solid article.

It is yet another object of the present invention to provide a process for coloring a hollow article.

As used herein, "slip" shall mean clay suspended in its carrier having a consistency which is pourable. A "slip" may be colored to any desired hue.

As used herein, "reciprocating protrusion" shall mean the protrusion which is formed on the clay article being shaped that is due to the seepage of slip into the seam of the mold.

As used herein, "solid article" shall mean a finished article without empty space, depression or cavity when visually compared with respect to the article's volume. Examples of "solid articles" include but are not limited to such things as china plates, tiles and selected types of pottery.

As used herein, "hollow article" shall mean a finished article having an empty space, depression or cavity when visually compared with respect to the article's volume. Examples of "hollow articles" include but are not limited to such things as figurines, ceramic bowls, vases, china cups and selected types of pottery.

As used herein, "predetermined," when related to the area of the mold, shall mean that the color or colors are applied to predesignated areas, with or without pattern, rather than with random artistic creative expression.

As used herein, "multidimensional" shall mean the visible exterior outline of a clay article which is asymmetrical with respect to its contour. An example of an asymmetrical article is a figurine while a vase is an example of a symmetrical article.

For what is believed to be millennia, the Age-old method of coloring a clay article was to first shape the article, with or without a mold, before coloring the article. However, more than a century ago, in 1894, U.S. Pat. No. 526,669 began modernizing the traditional method of inlaying touches onto the clay article. McLaughlin teaches that a colored slip could be used to paint the inside of a mold. Thus, the mold rather than the article being shaped is painted. Liquid clay is then poured into the mold, and as the mold absorbs the liquid from the clay, a deposit of color remains on the outside of the clay article being shaped.

Those skilled in the art will readily recognize that the present invention enables a process for coloring the clay articles being shaped by either the "slip cast" or "soft-pressed" techniques for molding clay. Thus, in accordance with the present invention, differing finished articles, such as, porcelains, china, tiles or roofs, to identify a few of the many, can be colored. More specifically, unlike the relevant prior art, the present process can be utilized for coloring a multidimensional exterior, such as a figurine, in exacting detail. Further, the present invention can be used in industrial or commercial settings where mass replication of predetermined colors and/or designs are necessary, or it can used by an individual in expressing random artistic color selection, as the work of art is created. Further still, when utilizing the present method, more than one color can be incorporated onto the exterior of either a solid or a hollow article. Significantly but unexpectedly, it has been determined that the present process can eliminate the need for firing the clay article twice, which, for generations, had been the accepted technique. And of equal, if not greater importance, when utilizing one embodiment of the present process, reciprocating protrusions are eliminated.

A first embodiment of the present invention can be briefly described as a process for coloring a hollow article made of clay, comprising the steps of: applying a first slip of a preselected color to a mold, then applying a second slip of a preselected color over a seam of the mold, thereafter adding a third slip to the mold for adsorbing color from the first and second slips before eliminating the unused third slip from the mold and removing the article for firing. If desired and within the ambit of this embodiment, a glaze may be applied to the article before firing. Additionally and within the scope of this particular embodiment the slips can be applied to a predetermined area of the mold. And if the finished article requires, the first slip and the second slip can be identically colored.

A second embodiment of the present invention can be briefly described as a process for coloring a solid article made of clay, comprising the steps of: applying a first slip of a preselected color to a mold, then adding a second slip to the mold for adsorbing color from the first slip, thereafter allowing the slips to dry before removing the article from the mold for firing. As with the first embodiment, if desired, a glaze may be applied to the article before firing. And within the scope of this particular embodiment, slip can be applied to a predetermined area of the mold.

Another embodiment of the present invention can be briefly described as a process for coloring an article made of clay, comprising the steps of: applying a slip to be adsorbed onto the article to the mold, thereafter pressing clay against the mold for adsorbing color onto the article before removing the article from the mold for firing. As with the previously described embodiments, the slip can be applied to a predetermined area of the mold while a glaze may also be applied to the article before firing.

A description of the preferred embodiments follows. And it is to be understood that these best mode descriptions do not limit the scope of the present invention. The breadth of the present invention is identified in the claims appended hereto.

DESCRIPTION OF THE PREFERRED EMBODIMENTS

Although the disclosure hereof is detailed to enable those skilled in the art to practice the invention, the embodiments published herein merely exemplify the present invention.

Figure 1:
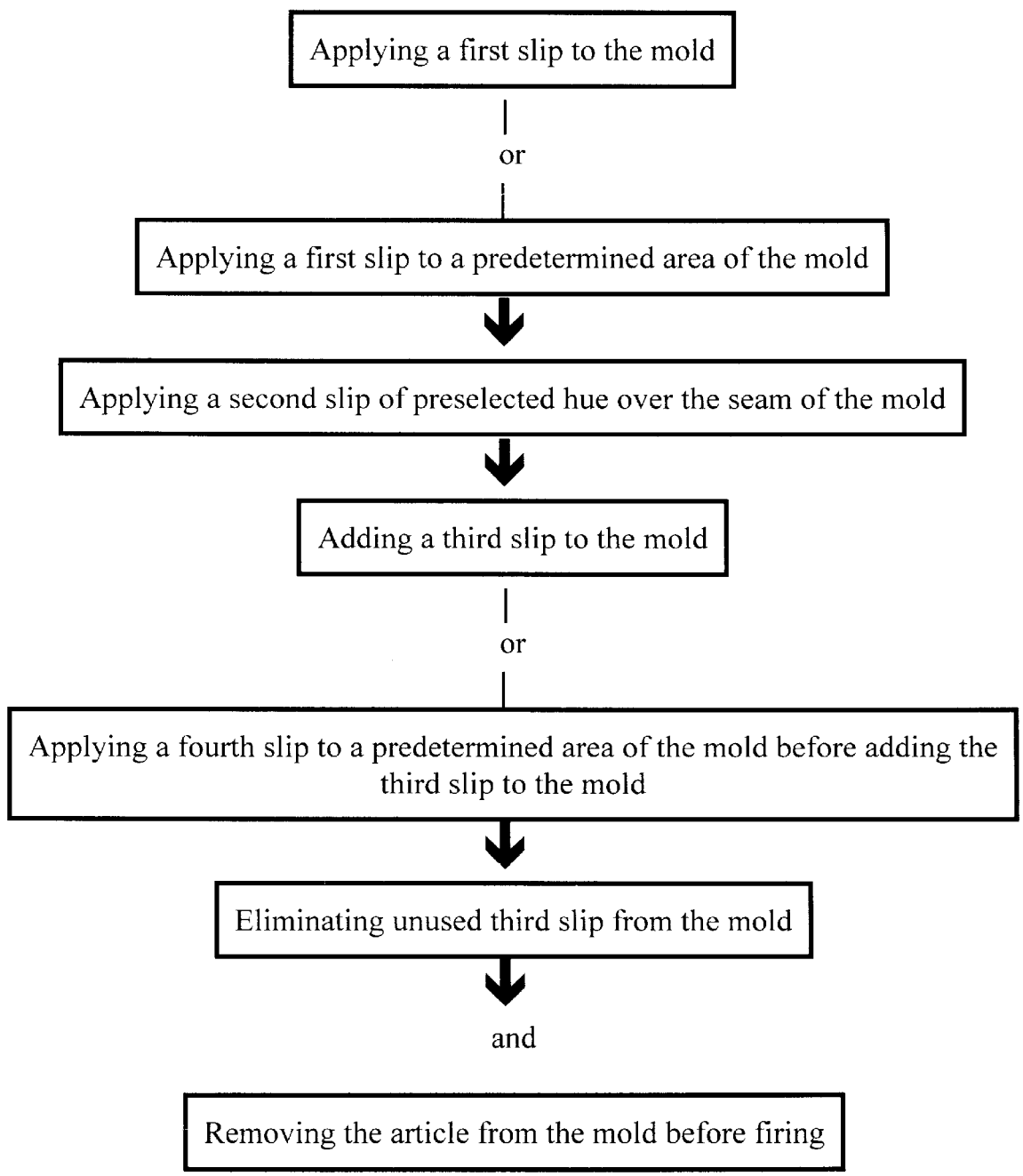
FIG. 1 identifies the fundamental steps of a first embodiment of the present invention.

FIG. 1 is a diagrammatic representation useful in understanding the practice of a first embodiment of the present process. This embodiment can be utilized with a mold that has any internal configuration for shaping the clay article, and is especially useful for casting a hollow article. A practical result of this specific embodiment is the elimination of the resultant protrusion on the article being shaped while those skilled in the art will quickly understand this that this embodiment can be easily adapted to the slip casting technique of forming clay articles. Depending upon the type of finished article required, a glaze can be applied to the article before firing while it has unexpectedly been determined that this process can also eliminate the necessity of double-firing the finished article.

Within the scope of the first embodiment, slip of any preselected hue can be employed onto the mold. At the same time, the slip can be applied to a predetermined area or areas of the mold. This feature is of great value, when mass replication and production of clay articles is required. However, this embodiment is also compatible with noncommercial usages. By way of example, a mentor could identify a predetermined area or areas of the mold, and his pupil would thereafter apply the slip or slips as instructed. Thus, in time, the novice would learn how to practice the present invention.

Also in accordance with the practice of this embodiment, in a commercial or industrial setting, a series of molds (including two or more molds), whether identical or not, can be attached to any suitable device or devices (not shown) which allow unused slip to be removed from the mold. For example, the series of molds can be attached to a mechanical device which allows the molds to be held and to be turned upside down for evacuating the unused slip. Additionally, the unused slip could also be removed by a suction device, e.g., a vacuum hose. It is immaterial to the practice of the present invention whether the elimination devices are mechanical, electromechanical, or pneumatic. In a similar vein, any suitable conveyor (not shown), such as a hose or duct can be utilized for delivering slip to the series of molds. By practicing these steps, the addition of the third slip to the mold before the first and second slips dry is possible.

Moreover, it has been concluded, depending upon the type of finished article desired, that when utilizing the industrial-commercial modes of the present embodiment high quality replications result by allowing the third slip to remain in the mold for the range of two minutes up to one hour.

Turning now with a specific view toward FIG. 1, it is shown that the fundamental practice of the first embodiment comprises the steps of: a) applying a first slip of a preselected color to a mold; b) applying a second slip of a preselected color over a seam of the mold; c) adding a third slip to the mold for adsorbing the color or colors from the first and second slips; d) eliminating the unused third slip from the mold; e) removing the article from the mold; and f) firing the article. As previously disclosed, a glaze may be applied to the article before firing. And depending upon the desired finished article, the color of the first and second slips may or may not be identical while the first slip can be applied to the mold before it is closed. Further, when the finished article mandates, slip of differing hues may be applied to the seam of the mold. Additionally, when the manufacture of the finished article mandates, a fourth slip, usually of different color than the first three slips, can be applied to any area of the mold. As circumstances dictate, as many fourth slips of differing colors as needed can be utilized. Finally, all slips can be applied to predetermined areas of the mold or molds.

Figure 2:
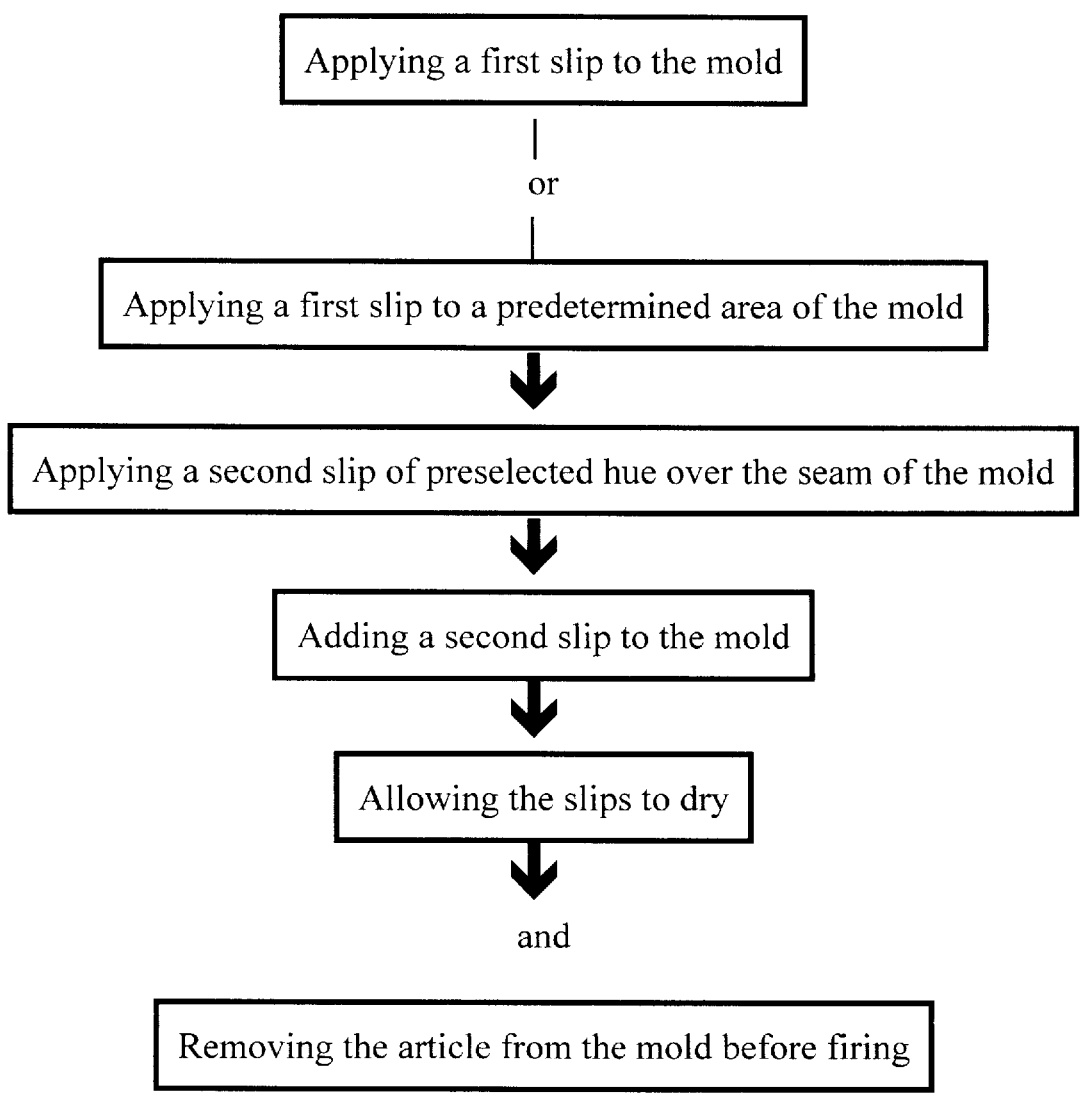
FIG. 2 identifies the fundamental steps of a second embodiment of the present invention.

FIG. 2 is a diagrammatic representation useful in understanding a second embodiment of the present process. This embodiment can be utilized with a mold that has any internal configuration for shaping the clay article, and is especially useful for shaping a solid article. This embodiment can also be adapted into what is known in the art as the "slip casting" technique. However, when utilizing the second embodiment of the present invention, resultant protrusions may not be eliminated, unless they are manually or mechanically removed after the article is removed from the mold. Thus, this embodiment is particularly useful when the resultant protrusion is primarily irrelevant or it cannot be observed because of the shape of the finished article. As with the first embodiment, depending upon the type of finished article required, a glaze can be applied to the article, before firing while it has unexpectedly been determined that this process can also eliminate the necessity of double-firing the finished article.

Within the ambit of the second embodiment, slip of any preselected hue can be employed onto the mold. At the same time, the slip can be applied to a predetermined area or areas of the mold. When mass replication and production of clay articles is required, such as in commercial or industrial settings, where a series of molds (including two or more molds), whether identical or not, are utilized, this feature is especially useful. As with the first embodiment, any suitable conveyor (not shown), such as a hose or duct can be utilized for delivering slip to the series of molds. And as with the first embodiment, it has been determined that high quality replications result by allowing the second slip to remain in the mold for the range of two minutes up to one hour.

Turning now toward FIG. 2, the diagram shows that the primary practice of the second embodiment comprises the steps of: a) applying a first slip of a preselected color to a mold; b) adding a second slip to the mold for adsorbing the color from the first slip; c) allowing the slips to dry; d) removing said article from the mold; and f) firing the article. A glaze may also be applied to the article before firing. Depending upon the desired finished article, the first slip which can be applied to the mold before it is closed and may comprise more than one hue or color which can be applied to any predetermined area or areas of the mold.

Figure 3:
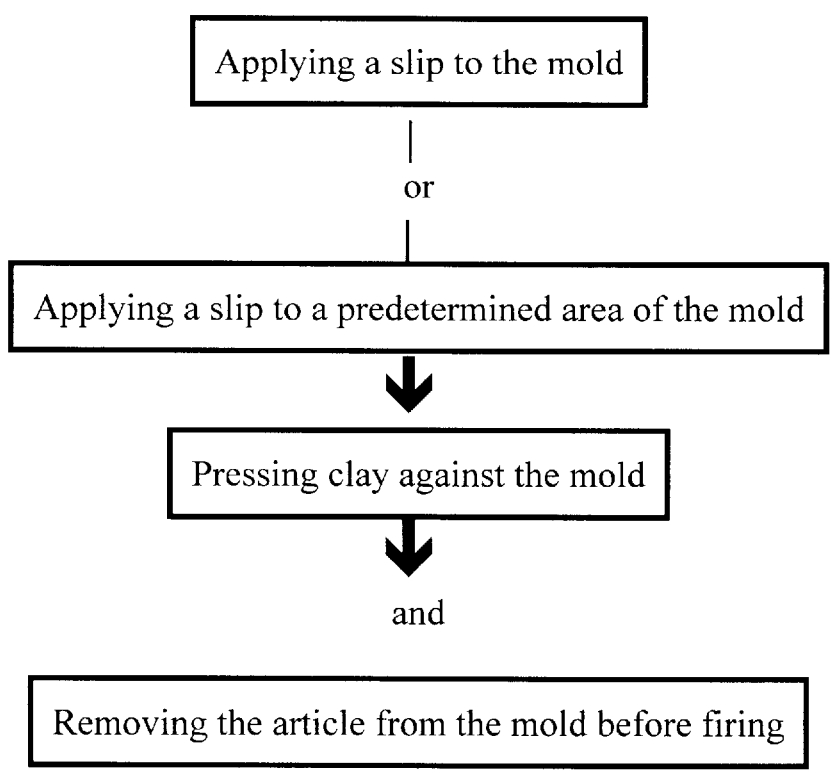
FIG. 3 identifies the fundamental steps of another embodiment of the present invention.

FIG. 3 is a diagrammatic representation useful in understanding another embodiment of the present process which is particularly adapted for coloring a clay article shaped by what is known commonly, in the art, as the "soft-pressed" technique. This embodiment of the present invention is especially useful in coloring such articles as tiles, roofs and domes. Additionally, a glaze may or may not be applied to the article before firing. Within the scope of this embodiment, the slip or slips to be employed onto the mold can be applied to a predetermined area or areas of the mold, thus enabling industrial-commercial applications, as well as noncommercial adaptations. Electromechanical or mechanical devices (not shown in FIG. 3) can also be adapted for both delivering the clay to the mold and pressing the clay against the mold.

Specifically, with a view toward FIG. 3, it is shown that the practice of the this embodiment comprises the steps of: a) applying at least one slip to a mold; b) pressing clay against the mold; and c) removing the article from the mold before firing the article. As with the other embodiments and as previously revealed, a glaze can be applied to the article before firing.

Having disclosed the invention as required by Title 35 of the United States Code, Applicants now pray respectfully that Letters Patent be granted for his invention in accordance with the scope of the claims appended hereto.

What is claimed is:

1. A process for coloring an article made of clay, comprising the steps of:
   a) applying a first slip of a preselected color to a mold;
   b) applying a second slip of a preselected color over a seam of said mold;
   c) adding a third slip to said mold to form said article and for adsorbing said colors from said first and said second slips;
   d) eliminating unused said third slip from said mold;
   e) removing said article from said mold; and
   f) firing said article.

2. The process of claim 1 further comprising the step of applying a glaze to said article before firing said article.

3. The process of claim 2 further comprising the step of applying a another first slip having a different color from said original first slip to said mold before applying said second slip over said seam.

4. The process of claim 3 further comprising the step of applying more than two first slips to said mold wherein each first slip is of differing color.

5. The process of claim 1 further comprising the step of applying more than one said second slip, each of differing colors, over said seam.

6. The process of claim 5 further comprising the step of applying a glaze to said article before firing said article.

7. The process of claim 1 wherein said unused third slip remains in said mold for at least two minutes but not more than one hour before eliminating said third slip from said mold.

8. A process for coloring an article made of clay, comprising the steps of:
   a) applying a first slip of a preselected color to a predetermined area of the mold;
   b) applying a second slip of a preselected color over a seam of said mold;
   c) adding a third slip to said mold to form said article and for adsorbing said colors from said first and said second slips;
   d) eliminating unused said third slip from said mold;
   e) removing said article from said mold; and
   f) firing said article.

9. The process of claim 1 further comprising the step of applying a glaze to said article before firing said article.

10. The process of claim 9 further comprising the step of applying another first slip having a different color from said original first slip to a predetermined area of said mold before applying said second slip over said seam.

11. The process of claim 10 further comprising the step of applying more than two first slips to a predetermined area of said mold wherein each first slip is of differing color.

12. The process of claim 8 further comprising the step of applying more than one said second slip, each of differing colors, over said seam.

13. The process of claim 12 further comprising the step of applying a glaze to said article before firing said article.

14. The process of claim 8 wherein said unused third slip remains in said mold for at least two minutes but not more than one hour before eliminating said third slip from said mold.

* * * * *